(12) United States Patent
Kirby et al.

(10) Patent No.: US 7,636,772 B1
(45) Date of Patent: Dec. 22, 2009

(54) METHOD AND APPARATUS FOR DYNAMIC RETENTION OF SYSTEM AREA NETWORK MANAGEMENT INFORMATION IN NON-VOLATILE STORE

(75) Inventors: Orvalle Theodore Kirby, Raleigh, NC (US); Gregory Michael Nordstrom, Pine Island, MN (US); Gregory Francis Pfister, Austin, TX (US); Renato John Recio, Austin, TX (US); Steven Mark Thurber, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2196 days.

(21) Appl. No.: 09/692,365

(22) Filed: Oct. 19, 2000

(51) Int. Cl.
*G06F 15/16* (2006.01)
*G06F 9/00* (2006.01)
*G06F 13/00* (2006.01)

(52) U.S. Cl. ............ 709/221; 709/222; 713/1; 713/2; 713/100; 370/278; 710/104

(58) Field of Classification Search .......... 709/220, 709/221; 713/1, 2, 100; 710/104; 370/278
See application file for complete search history.

(56) References Cited

U.S. PATENT DOCUMENTS

| | | | |
|---|---|---|---|
| 4,638,356 A | 1/1987 | Frezza | 358/118 |
| 4,814,984 A | 3/1989 | Thompson | 364/200 |
| 4,939,752 A | 7/1990 | Literati et al. | 375/107 |
| 4,951,225 A | 8/1990 | Lee et al. | 364/513 |
| 4,975,829 A | 12/1990 | Clarey et al. | 364/200 |
| 5,043,981 A | 8/1991 | Firoozmand et al. | 370/85.1 |
| 5,185,736 A | 2/1993 | Tyrrell et al. | 370/55 |
| 5,185,741 A | 2/1993 | Iguchi et al. | 370/110.1 |
| 5,218,680 A | 6/1993 | Farrell et al. | 395/325 |
| 5,402,416 A | 3/1995 | Cieslak et al. | 370/60 |
| 5,461,608 A | 10/1995 | Yoshiyama | 370/16.1 |
| 5,513,368 A | 4/1996 | Garcia, Jr. et al. | 395/842 |
| 5,551,066 A | 8/1996 | Stillman et al. | 455/69 |
| 5,610,980 A | 3/1997 | Johnson et al. | 380/4 |

(Continued)

FOREIGN PATENT DOCUMENTS

JP  2002064587  4/2002

(Continued)

OTHER PUBLICATIONS

Nehmer et al. "Fault Tolerance Approach for Distributed ISDN Control Systems", ACM SIGOPS European Workshop, Proceedings of the fourth workshop on ACM SIGOPS European workshop 1990, Bologna, Italy, 1990, pp. 1-4.

*Primary Examiner*—Ashok B Patel
(74) *Attorney, Agent, or Firm*—Yee & Associates, P.C.; Diana R. Gerhardt

(57) ABSTRACT

A method in a network computing system for managing configuration information for a set of components in a network computing system. The configuration information is stored for the set of components in the network computing system to form stored configuration information. In the depicted examples, the components may be nodes or devices within nodes. Current configuration is obtained in response to a power cycle. The current configuration information is compared with the stored configuration information to form a comparison. The stored configuration information is updated if a difference is present in the comparison. The stored configuration information is used to configure the components when a power cycle occurs.

22 Claims, 6 Drawing Sheets

U.S. PATENT DOCUMENTS

| | | | |
|---|---|---|---|
| 5,617,424 | A | 4/1997 | Murayama et al. ........... 370/389 |
| 5,617,537 | A | 4/1997 | Yamada et al. .......... 395/200.01 |
| 5,719,938 | A | 2/1998 | Haas et al. ..................... 380/21 |
| 5,729,686 | A | 3/1998 | Heck et al. ............. 395/200.38 |
| 5,758,083 | A | 5/1998 | Singh et al. ............ 395/200.53 |
| 5,778,176 | A | 7/1998 | Geihs et al. ............. 395/200.12 |
| 5,793,968 | A | 8/1998 | Gregerson et al. ...... 395/200.39 |
| 5,805,072 | A | 9/1998 | Kakemizu .............. 340/825.03 |
| 5,884,036 | A | 3/1999 | Haley ..................... 395/200.54 |
| 5,907,689 | A | 5/1999 | Tavallaei et al. ............. 395/290 |
| 5,951,683 | A | 9/1999 | Yuuki et al. ...................... 713/1 |
| 6,032,191 | A | 2/2000 | Chowdhury et al. ......... 709/238 |
| 6,081,752 | A | 6/2000 | Benson, IV et al. ........... 700/79 |
| 6,085,238 | A | 7/2000 | Yuasa et al. ................. 709/223 |
| 6,092,214 | A | 7/2000 | Quoc et al. ...................... 714/4 |
| 6,098,098 | A * | 8/2000 | Sandahl et al. ............... 709/221 |
| 6,108,739 | A | 8/2000 | James et al. ................. 710/113 |
| 6,115,776 | A | 9/2000 | Reid et al. ................... 710/260 |
| 6,128,738 | A | 10/2000 | Doyle et al. ................. 713/185 |
| 6,192,397 | B1 | 2/2001 | Thompson .................. 709/209 |
| 6,199,133 | B1 | 3/2001 | Schnell ....................... 710/110 |
| 6,222,822 | B1 | 4/2001 | Gerardin et al. ............. 370/230 |
| 6,269,396 | B1 | 7/2001 | Shah et al. ................... 709/223 |
| 6,298,376 | B1 | 10/2001 | Rosner et al. ................ 709/209 |
| 6,304,973 | B1 | 10/2001 | Williams ..................... 713/201 |
| 6,311,321 | B1 | 10/2001 | Agnihotri et al. ............... 717/1 |
| 6,330,555 | B1 | 12/2001 | Weber ............................ 707/2 |
| 6,341,322 | B1 | 1/2002 | Liu et al. ..................... 710/129 |
| 6,343,320 | B1 | 1/2002 | Fairchild et al. ............. 709/224 |
| 6,363,411 | B1 | 3/2002 | Dugan et al. ................. 709/202 |
| 6,363,416 | B1 | 3/2002 | Naeimi et al. ................ 709/209 |
| 6,363,495 | B1 | 3/2002 | MacKenzie et al. ............. 714/4 |
| 6,389,432 | B1 | 5/2002 | Pothapragada et al. ...... 707/205 |
| 6,421,779 | B1 | 7/2002 | Kuroda et al. ............... 713/169 |
| 6,434,113 | B1 | 8/2002 | Gubbi ......................... 370/216 |
| 6,470,397 | B1 | 10/2002 | Shah et al. ................... 709/250 |
| 6,496,503 | B1 * | 12/2002 | Pelissier et al. ............. 370/389 |
| 6,507,592 | B1 | 1/2003 | Hurvig et al. ............... 370/503 |
| 6,529,286 | B1 | 3/2003 | King ......................... 358/1.14 |
| 6,597,956 | B1 | 7/2003 | Aziz et al. ....................... 700/3 |
| 6,636,520 | B1 | 10/2003 | Jason et al. .................. 370/401 |
| 6,654,363 | B1 | 11/2003 | Li et al. ....................... 370/338 |
| 6,658,417 | B1 | 12/2003 | Stakutis et al. ................. 707/10 |
| 6,664,978 | B1 | 12/2003 | Kekic et al. ................. 345/733 |
| 6,665,714 | B1 | 12/2003 | Blumenau et al. ........... 709/222 |
| 6,674,911 | B1 | 1/2004 | Pearlman et al. ............ 382/240 |
| 6,694,361 | B1 * | 2/2004 | Shah et al. ................... 709/222 |
| 6,708,272 | B1 | 3/2004 | McCown et al. ............ 713/151 |
| 2002/0021307 | A1 | 2/2002 | Glenn et al. ................. 345/753 |
| 2002/0026517 | A1 | 2/2002 | Watson, Jr. .................. 709/228 |
| 2002/0073257 | A1 | 6/2002 | Beukema et al. ............ 710/105 |
| 2002/0133620 | A1 | 9/2002 | Krause ........................ 709/238 |
| 2003/0018787 | A1 | 1/2003 | Neal et al. ................... 709/227 |
| 2003/0046505 | A1 | 3/2003 | Craddock et al. ........... 711/165 |
| 2004/0057424 | A1 | 3/2004 | Kokkonen ................... 370/352 |

FOREIGN PATENT DOCUMENTS

WO    WO 00/72519    11/2000

* cited by examiner

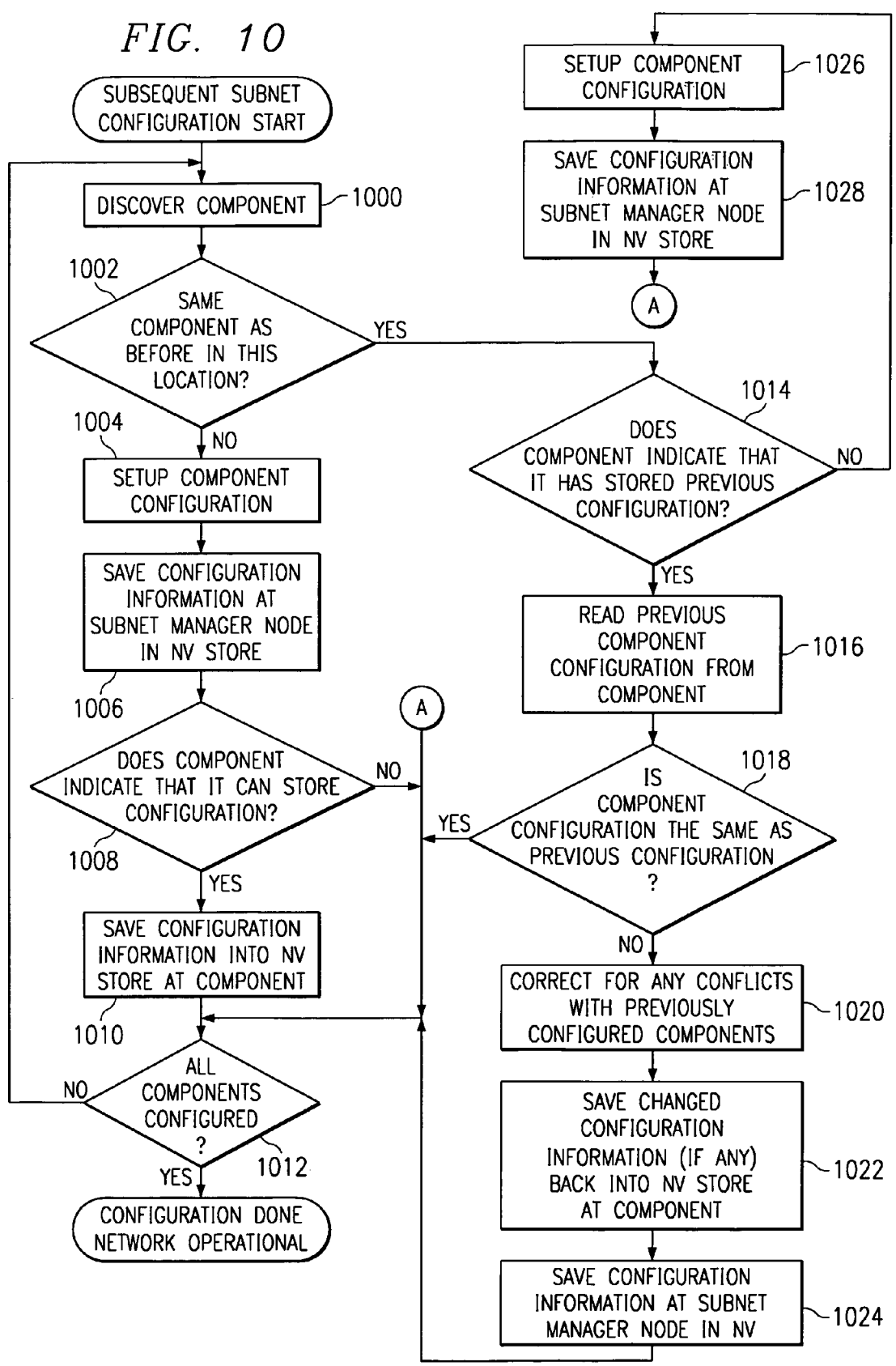

METHOD AND APPARATUS FOR DYNAMIC RETENTION OF SYSTEM AREA NETWORK MANAGEMENT INFORMATION IN NON-VOLATILE STORE

CROSS REFERENCES TO RELATED APPLICATIONS

The present invention is related to applications entitled System Area Network of End-to-End Context via Reliable Datagram Domains, Ser. No. 09/692,354, now U.S. Pat. No. 6,990,528; Method and Apparatus for Pausing a Send Queue without Causing Sympathy Errors, Ser. No. 09/692,340, now U.S. Pat. No. 6,766,467; Method and Apparatus to Perform Fabric Management, Ser. No. 09/692,344, now U.S. Pat. No. 6,978,300; End Node Partitioning using LMC for a System Area Network, Ser. No. 09/692,351, now U.S. Pat. No. 7,099,955; Method and Apparatus for Retaining Network Security Settings Across Power Cycles, Ser. No. 09/692,337, now abandoned; Method and Apparatus for Reporting Unauthorized Attempts to Access Nodes in a Network Computing System, Ser. No. 09/692,348, now U.S. Pat. No. 7,113,995; Method and Apparatus for Reliably Choosing a Master Network Manager During Initialization of a Network Computing System, Ser. No. 09/692,346, now U.S. Pat. No. 6,941,350; Method and Apparatus for Ensuring Scalable Mastership During Initialization of a System Area Network, Ser. No. 09/692,341, now U.S. Pat. No. 6,981,025; and Method and Apparatus for Using a Service ID for the Equivalent of Port ID in a Network Computing System, Ser. No. 09/692,352, now abandoned, all of which are filed even date hereof, assigned to the same assignee, and incorporated herein by reference.

BACKGROUND OF THE INVENTION

1. Technical Field

The present invention relates generally to an improved data processing system, and in particular to a method and apparatus for managing a network computing system. Still more particularly, the present invention provides a method and apparatus for retaining configuration and management information for a network computing system.

2. Description of Related Art

In a System Area Network (SAN), the hardware provides a message passing mechanism which can be used for Input/Output devices (I/O) and interprocess communications between general computing nodes (IPC). Processes executing on devices access SAN message passing hardware by posting send/receive messages to send/receive work queues on a SAN channel adapter (CA). These processes also are referred to as "consumers". The send/receive work queues (WQ) are assigned to a consumer as a queue pair (QP). The messages can be sent over five different transport types: Reliable Connected (RC), Reliable datagram (RD), Unreliable Connected (UC), Unreliable Datagram (UD), and Raw Datagram (RawD). Consumers retrieve the results of these messages from a completion queue (CQ) through SAN send and receive work completions (WC). The source channel adapter takes care of segmenting outbound messages and sending them to the destination. The destination channel adapter takes care of reassembling inbound messages and placing them in the memory space designated by the destination's consumer. Two channel adapter types are present, a host channel adapter (HCA) and a target channel adapter (TCA). The host channel adapter is used by general purpose computing nodes to access the SAN fabric. Consumers use SAN verbs to access host channel adapter functions. The software that interprets verbs and directly accesses the channel adapter is known as the channel interface (CI).

Within a SAN, the different consumers execute on nodes or devices within a node. For example, a node may be a host channel processor or a switch, while a device may be a channel adapter within a host channel processor. In managing the SAN, different nodes may be turned on and off at different times. Additionally, in some cases all of the nodes within the SAN may be powered on at the same time. In powering on nodes, the nodes are initialized and nodes within the SAN are discovered. In this situation, large initialization or boot times may occur, which results in lost time and possibly frustration to a user of the SAN.

In addition, after initialization, a customer may change the assignments made automatically by the subnet manager. Changes that a customer may want to make include: creation of multiple partitions, ports participating in a specific partition, and service levels that can be used by a given port. Without the ability to retain these manual changes, after each initialization the customer would have to redo all the assignments he had previously made.

Therefore, it would be advantageous to have an improved method and apparatus for increasing the speed at which configuration of nodes occur during initialization of the nodes, as well as maintaining manual configuration changes made by the customer.

SUMMARY OF THE INVENTION

The present invention provides a method in a network computing system for managing configuration information for a set of components in a network computing system. The configuration information is stored for the set of components in the network computing system to form stored configuration information. In the depicted examples, the components may be nodes or devices within nodes. Current configuration is obtained in response to a power cycle. The current configuration information is compared with the stored configuration information to form a comparison. The stored configuration information is updated if a difference is present in the comparison. The stored configuration information is used to configure the components when a power cycle occurs.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 10 is a flowchart of a process used for subsequent configuration of a subnet in accordance with a preferred embodiment of the present invention.

DETAILED DESCRIPTION OF THE PREFERRED EMBODIMENT

The present invention provides a network computing system having end nodes, switches, routers, and links interconnecting these components. Each end node uses send and receive queue pairs to transmit and receives messages. The end nodes segment the message into packets and transmit the packets over the links. The switches and routers interconnects the end nodes and route the packets to the appropriate end node. The end nodes reassemble the packets into a message at the destination.

Figure 1:
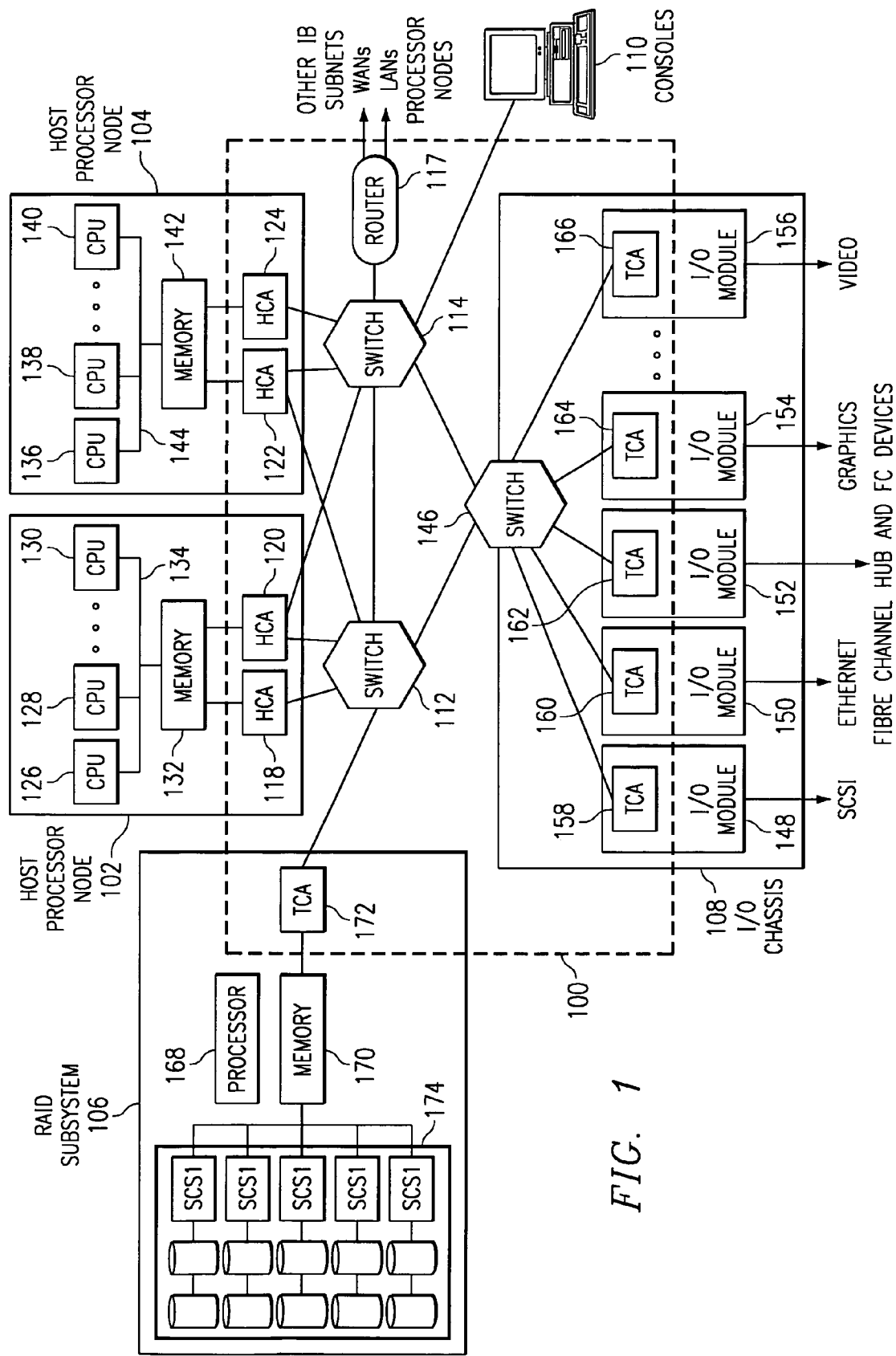
FIG. 1 is a diagram of a network computing system is illustrated in accordance with a preferred embodiment of the present invention.

With reference now to the figures and in particular with reference to FIG. 1, a diagram of a network computing system is illustrated in accordance with a preferred embodiment of the present invention. The network computing system represented in FIG. 1 takes the form of a system area network (SAN) 100 and is provided merely for illustrative purposes, and the embodiments of the present invention described below can be implemented on computer systems of numerous other types and configurations. For example, computer systems implementing the present invention can range from a small server with one processor and a few input/output (I/O) adapters to massively parallel supercomputer systems with hundreds or thousands of processors and thousands of I/O adapters. Furthermore, the present invention can be implemented in an infrastructure of remote computer systems connected by an internet or intranet.

SAN 100 is a high-bandwidth, low-latency network interconnecting nodes within the network computing system. A node is any component attached to one or more links of a network. In the depicted example, SAN 100 includes nodes in the form of host processor node 102, host processor node 104, redundant array independent disk (RAID) subsystem node 106, switch node 112, switch node 114, router node 117, and I/O chassis node 108. The nodes illustrated in FIG. 1 are for illustrative purposes only, as SAN 100 can connect any number and any type of independent processor nodes, and I/O adapter nodes. Any one of the nodes can function as an end node, which is herein defined to be a device that originates or finally consumes messages or frames in SAN 100.

In one embodiment of the present invention, an error handling mechanism in distributed computer systems is present in which the error handling mechanism allows for reliable connection or reliable datagram communication between end nodes in network computing system, such as SAN 100.

A message, as used herein, is an application-defined unit of data exchange, which is a primitive unit of communication between cooperating processes. A packet is one unit of data encapsulated by a networking protocol headers and/or trailer. The headers generally provide control and routing information for directing the frame through SAN. The trailer generally contains control and cyclic redundancy check (CRC) data for ensuring packets are not delivered with corrupted contents.

SAN 100 contains the communications and management infrastructure supporting both I/O and interprocessor communications (IPC) within a network computing system. The SAN 100 shown in FIG. 1 includes a switched communications fabric, which allows many devices to concurrently transfer data with high-bandwidth and low latency in a secure, remotely managed environment. End nodes can communicate over multiple ports and utilize multiple paths through the SAN fabric. The multiple ports and paths through the SAN shown in FIG. 1 can be employed for fault tolerance and increased bandwidth data transfers.

The SAN 100 in FIG. 1 includes switch 112, switch 114, switch 146, and router 117. A switch is a device that connects multiple links together and allows routing of packets from one link to another link within a subnet using a small header Destination Local Identifier (DLID) field. A router is a device that connects multiple subnets together and is capable of routing frames from one link in a first subnet to another link in a second subnet using a large header Destination Globally Unique Identifier (DGUID).

In one embodiment, a link is a full duplex channel between any two network fabric elements, such as end nodes, switches, or routers. Example suitable links include, but are not limited to, copper cables, optical cables, and printed circuit copper traces on backplanes and printed circuit boards.

For reliable service types, end nodes, such as host processor end nodes and I/O adapter end nodes, generate request packets and return acknowledgment packets. Switches and routers pass packets along, from the source to the destination. Except for the variant CRC trailer field which is updated at each stage in the network, switches pass the packets along unmodified. Routers update the variant CRC trailer field and modify other fields in the header as the packet is routed.

In SAN 100 as illustrated in FIG. 1, host processor node 102, host processor node 104, RAID I/O subsystem 106, and I/O chassis 108 include at least one channel adapter (CA) to interface to SAN 100. In one embodiment, each channel adapter is an endpoint that implements the channel adapter interface in sufficient detail to source or sink packets transmitted on SAN fabric 100. Host processor node 102 contains channel adapters in the form of host channel adapter 118 and host channel adapter 120. Host processor node 104 contains host channel adapter 122 and host channel adapter 124. Host processor node 102 also includes central processing units 126-130 and a memory 132 interconnected by bus system 134. Host processor node 104 similarly includes central processing units 136-140 and a memory 142 interconnected by a bus system 144.

Host channel adapters 118 and 120 provide a connection to switch 112 while host channel adapters 122 and 124 provide a connection to switches 112 and 114.

In one embodiment, a host channel adapter is implemented in hardware. In this implementation, the host channel adapter hardware offloads much of central processing unit and I/O adapter communication overhead. This hardware implementation of the host channel adapter also permits multiple concurrent communications over a switched network without the traditional overhead associated with communicating protocols. In one embodiment, the host channel adapters and SAN 100 in FIG. 1 provide the I/O and interprocessor communications (IPC) consumers of the network computing system with zero processor-copy data transfers without involving the operating system kernel process, and employs hardware to provide reliable, fault tolerant communications.

As indicated in FIG. 1, router 117 is coupled to wide area network (WAN) and/or local area network (LAN) connections to other hosts or other routers.

The I/O chassis 108 in FIG. 1 includes a switch 146 and multiple I/O modules 148-156. In these examples, the I/O modules take the form of adapter cards. Example adapter cards illustrated in FIG. 1 include a SCSI adapter card for I/O module 148; an adapter card to fiber channel hub and fiber channel-arbitrated loop (FC-AL) devices for I/O module 152; an ethernet adapter card for I/O module 150; a graphics adapter card for I/O module 154; and a video adapter card for I/O module 156. Any known type of adapter card can be implemented. I/O adapters also include a switch in the I/O adapter backplane to couple the adapter cards to the SAN fabric. These modules contain target channel adapters 158-166.

In this example, RAID subsystem node 106 in FIG. 1 includes a processor 168, a memory 170, a target channel adapter (TCA) 172, and multiple redundant and/or striped storage disk unit 174. Target channel adapter 172 can be a fully functional host channel adapter.

SAN 100 handles data communications for I/O and interprocessor communications. SAN 100 supports high-bandwidth and scalability required for I/O and also supports the extremely low latency and low CPU overhead required for interprocessor communications. User clients can bypass the operating system kernel process and directly access network communication hardware, such as host channel adapters, which enable efficient message passing protocols. SAN 100 is suited to current computing models and is a building block for new forms of I/O and computer cluster communication. Further, SAN 100 in FIG. 1 allows I/O adapter nodes to communicate among themselves or communicate with any or all of the processor nodes in network computing system. With an I/O adapter attached to the SAN 100, the resulting I/O adapter node has substantially the same communication capability as any host processor node in SAN 100.

Figure 2:
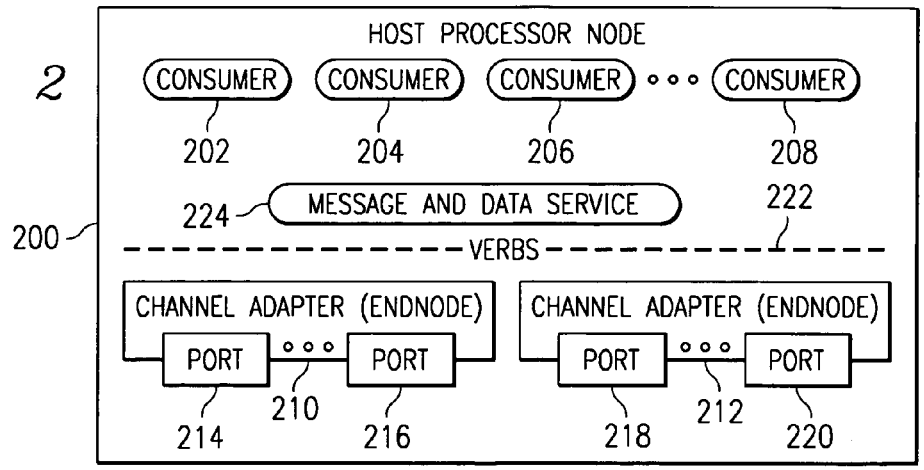
FIG. 2 is a functional block diagram of a host processor node in accordance with a preferred embodiment of the present invention.

Turning next to FIG. 2, a functional block diagram of a host processor node is depicted in accordance with a preferred embodiment of the present invention. Host processor node 200 is an example of a host processor node, such as host processor node 102 in FIG. 1. In this example, host processor node 200, shown in FIG. 2, includes a set of consumers 202-208, which are processes executing on host processor node 200. Host processor node 200 also includes channel adapter 210 and channel adapter 212. Channel adapter 210 contains ports 214 and 216 while channel adapter 212 contains ports 218 and 220. Each port connects to a link. The ports can connect to one SAN subnet or multiple SAN subnets, such as SAN 100 in FIG. 1. In these examples, the channel adapters take the form of host channel adapters.

Consumers 202-208 transfer messages to the SAN via the verbs interface 222 and message and data service 224. A verbs interface is essentially an abstract description of the functionality of a host channel adapter. An operating system may expose some or all of the verb functionality through its programming interface. Basically, this interface defines the behavior of the host. Additionally, host processor node 200 includes a message and data service 224, which is a higher level interface than the verb layer and is used to process messages and data received through channel adapter 210 and channel adapter 212.

Figure 3:
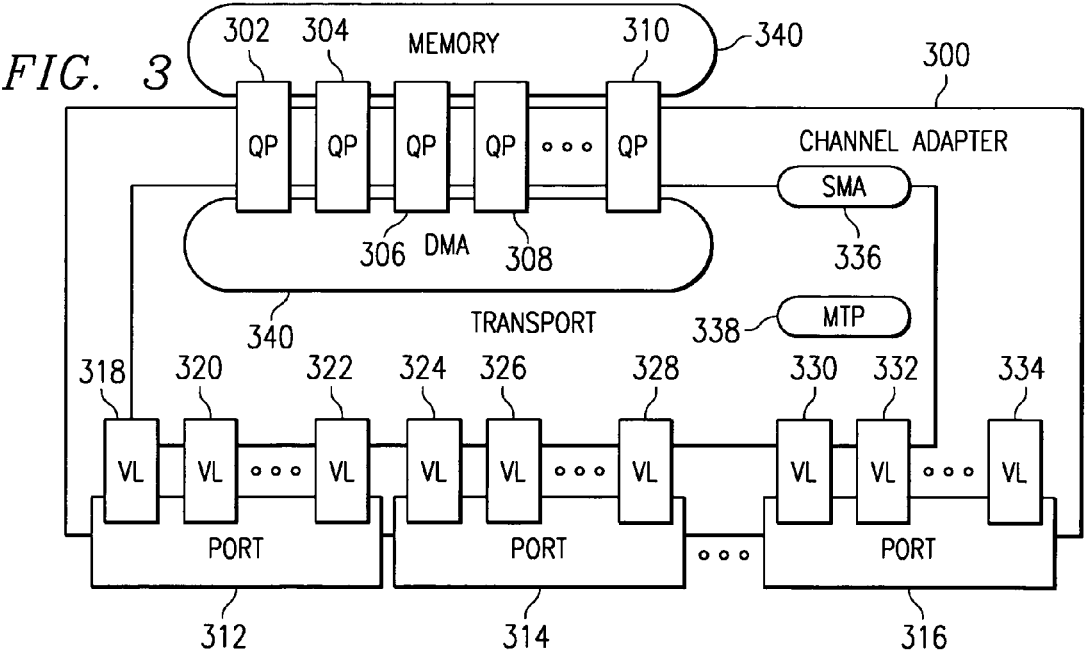
FIG. 3 is a diagram of a host channel adapter in accordance with a preferred embodiment of the present invention.

With reference now to FIG. 3, a diagram of a host channel adapter is depicted in accordance with a preferred embodiment of the present invention. Host channel adapter 300 shown in FIG. 3 includes a set of queue pairs (QPs) 302-310, which are used to transfer messages to the host channel adapter ports 312-316. Buffering of data to host channel adapter ports 312-316 is channeled through virtual lanes (VL) 318-334 where each VL has its own flow control. Subnet manager configures channel adapters with the local addresses for each physical port, i.e., the port's LID. Subnet manager agent (SMA) 336 is the entity that communicates with the subnet manager for the purpose of configuring the channel adapter. Memory translation and protection (MTP) 338 is a mechanism that translates virtual addresses to physical addresses and to validate access rights. Direct memory access (DMA) 340 provides for direct memory access operations using memory 340 with respect to queue pairs 302-310.

A single channel adapter, such as the host channel adapter 300 shown in FIG. 3, can support thousands of queue pairs. By contrast, a target channel adapter in an I/O adapter typically supports a much smaller number of queue pairs.

Each queue pair consists of a send work queue (SWQ) and a receive work queue. The send work queue is used to send channel and memory semantic messages. The receive work queue receives channel semantic messages. A consumer calls an operating-system specific programming interface, which is herein referred to as verbs, to place work requests (WRs) onto a work queue.

Figure 4:
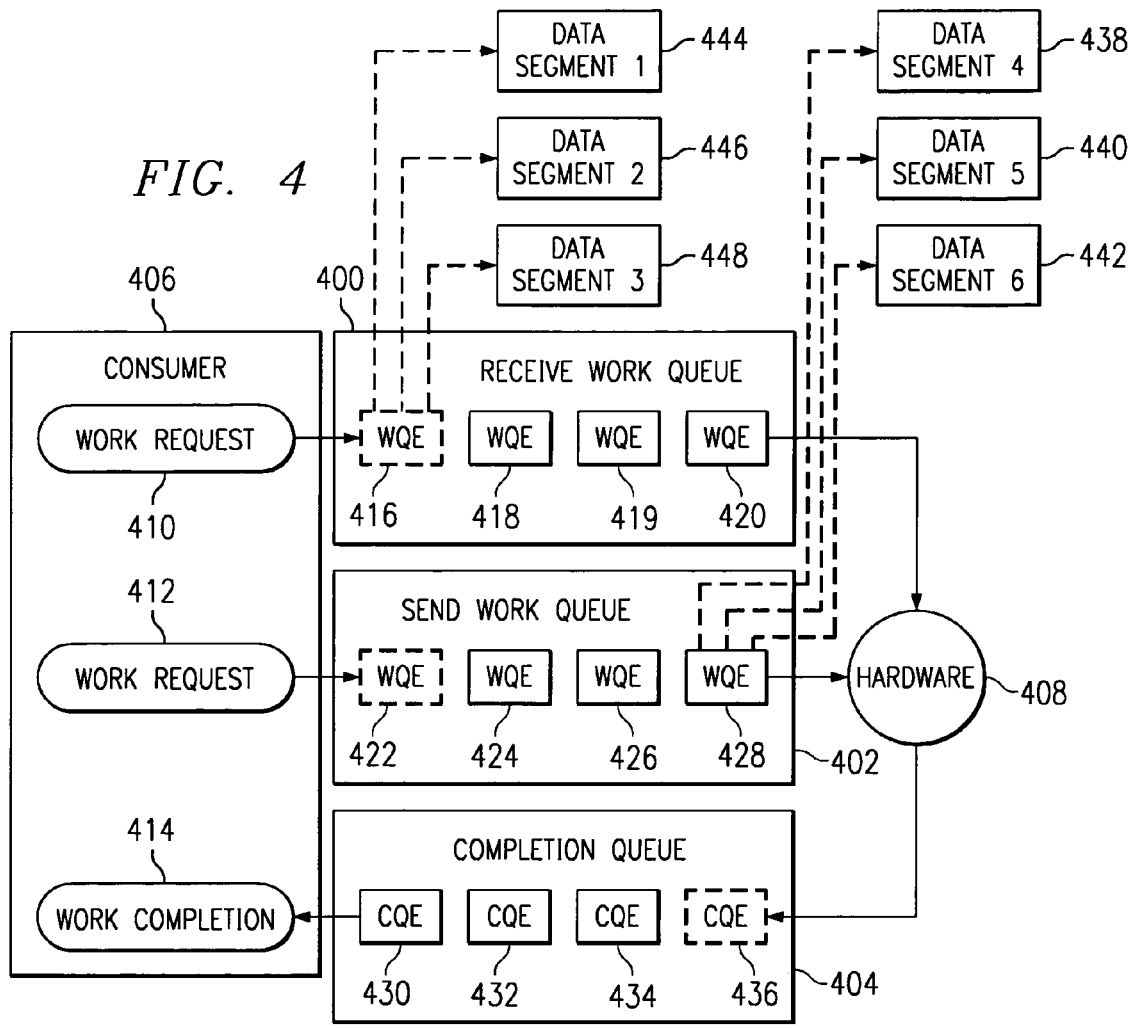
FIG. 4 is a diagram illustrating processing of work requests in accordance with a preferred embodiment of the present invention.

With reference now to FIG. 4, a diagram illustrating processing of work requests is depicted in accordance with a preferred embodiment of the present invention. In FIG. 4, a receive work queue 400, send work queue 402, and completion queue 404 are present for processing requests from and for consumer 406. These requests from consumer 402 are eventually sent to hardware 408. In this example, consumer 406 generates work requests 410 and 412 and receives work completion 414. As shown in FIG. 4, work requests placed onto a work queue are referred to as work queue elements (WQEs).

Send work queue 402 contains work queue elements (WQEs) 422-428, describing data to be transmitted on the SAN fabric. Receive work queue 400 contains work queue elements (WQEs) 416-420, describing where to place incoming channel semantic data from the SAN fabric. A work queue element is processed by hardware 408 in the host channel adapter.

The verbs also provide a mechanism for retrieving completed work from completion queue 404. As shown in FIG. 4, completion queue 404 contains completion queue elements (CQES) 430-436. Completion queue elements contain information about previously completed work queue elements. Completion queue 404 is used to create a single point of completion notification for multiple queue pairs. A completion queue element is a data structure on a completion queue. This element describes a completed work queue element. The completion queue element contains sufficient information to determine the queue pair and specific work queue element that completed. A completion queue context is a block of information that contains pointers to, length, and other information needed to manage the individual completion queues.

Example work requests supported for the send work queue 402 shown in FIG. 4 are as follows. A send work request is a channel semantic operation to push a set of local data segments to the data segments referenced by a remote node's receive work queue element. For example, work queue element 428 contains references to data segment 4 438, data segment 5 440, and data segment 6 442. Each of the send work request's data segments contains a virtually contiguous memory region. The virtual addresses used to reference the local data segments are in the address context of the process that created the local queue pair.

A remote direct memory access (RDMA) read work request provides a memory semantic operation to read a virtually contiguous memory space on a remote node. A memory space can either be a portion of a memory region or portion of a memory window. A memory region references a previously registered set of virtually contiguous memory addresses defined by a virtual address and length. A memory window references a set of virtually contiguous memory addresses which have been bound to a previously registered region.

The RDMA Read work request reads a virtually contiguous memory space on a remote end node and writes the data to a virtually contiguous local memory space. Similar to the send work request, virtual addresses used by the RDMA Read work queue element to reference the local data segments are in the address context of the process that created the local queue pair. For example, work queue element 416 in receive work queue 400 references data segment 1 444, data segment 2 446, and data segment 448. The remote virtual addresses are in the address context of the process owning the remote queue pair targeted by the RDMA Read work queue element.

A RDMA Write work queue element provides a memory semantic operation to write a virtually contiguous memory space on a remote node. The RDMA Write work queue element contains a scatter list of local virtually contiguous memory spaces and the virtual address of the remote memory space into which the local memory spaces are written.

A RDMA FetchOp work queue element provides a memory semantic operation to perform an atomic operation on a remote word. The RDMA FetchOp work queue element is a combined RDMA Read, Modify, and RDMA Write operation. The RDMA FetchOp work queue element can support several read-modify-write operations, such as Compare and Swap if equal.

A bind (unbind) remote access key (R_Key) work queue element provides a command to the host channel adapter hardware to modify (destroy) a memory window by associating (disassociating) the memory window to a memory region. The R_Key is part of each RDMA access and is used to validate that the remote process has permitted access to the buffer.

In one embodiment, receive work queue 400 shown in FIG. 4 only supports one type of work queue element, which is referred to as a receive work queue element. The receive work queue element provides a channel semantic operation describing a local memory space into which incoming send messages are written. The receive work queue element includes a scatter list describing several virtually contiguous memory spaces. An incoming send message is written to these memory spaces. The virtual addresses are in the address context of the process that created the local queue pair.

For interprocessor communications, a user-mode software process transfers data through queue pairs directly from where the buffer resides in memory. In one embodiment, the transfer through the queue pairs bypasses the operating system and consumes few host instruction cycles. Queue pairs permit zero processor-copy data transfer with no operating system kernel involvement. The zero processor-copy data transfer provides for efficient support of high-bandwidth and low-latency communication.

When a queue pair is created, the queue pair is set to provide a selected type of transport service. In one embodiment, a network computing system implementing the present invention supports four types of transport services.

Reliable and unreliable connected services associate a local queue pair with one and only one remote queue pair. Connected services require a process to create a queue pair for each process which is to communicate with over the SAN fabric. Thus, if each of N host processor nodes contain P processes, and all P processes on each node wish to communicate with all the processes on all the other nodes, each host processor node requires $P^2 \times (N-1)$ queue pairs. Moreover, a process can connect a queue pair to another queue pair on the same host channel adapter.

Reliable datagram service associates a local end-end (EE) context with one and only one remote end-end context. The reliable datagram service permits a client process of one queue pair to communicate with any other queue pair on any other remote node. At a receive work queue, the reliable datagram service permits incoming messages from any send work queue on any other remote node. The reliable datagram service greatly improves scalability because the reliable datagram service is connectionless. Therefore, an end node with a fixed number of queue pairs can communicate with far more processes and end nodes with a reliable datagram service than with a reliable connection transport service. For example, if each of N host processor nodes contain P processes, and all P processes on each node wish to communicate with all the processes on all the other nodes, the reliable connection service requires $P^2 \times (N-1)$ queue pairs on each node. By comparison, the connectionless reliable datagram service only requires P queue pairs+(N-1) EE contexts on each node for exactly the same communications.

The unreliable datagram service is connectionless. The unreliable datagram service is employed by management applications to discover and integrate new switches, routers, and end nodes into a given network computing system. The unreliable datagram service does not provide the reliability guarantees of the reliable connection service and the reliable datagram service. The unreliable datagram service accordingly operates with less state information maintained at each end node.

SAN architecture management facilities provide for a subnet manager (SM) and an infrastructure that supports a number of general management services. The management infrastructure requires a subnet management agent (SMA) in each node and defines a general service interface that allows additional general services agents.

The SAN architecture defines a common management datagram (MAD) message structure for communicating between managers and management agents. The subnet manager is an entity attached to a subnet that is responsible for configuring and managing switches, routers, and channel adapters. The subnet manager can be implemented with other devices, such as a channel adapter or a switch.

Figure 5:
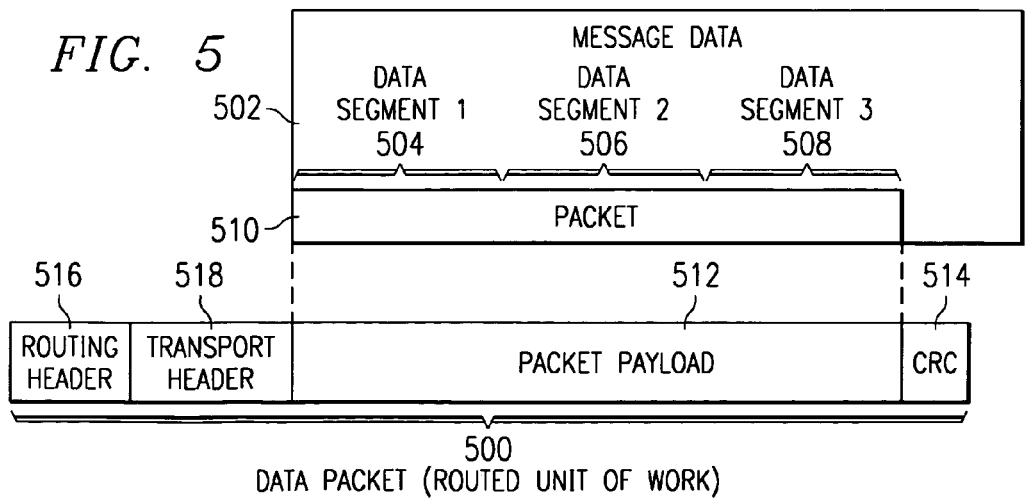
FIG. 5 is an illustration of a data packet in accordance with a preferred embodiment of the present invention.

Turning next to FIG. 5, an illustration of a data packet is depicted in accordance with a preferred embodiment of the present invention.

In data packet 500, message data 502 contains data segment 1 504, data segment 2 506, and data segment 3 508, which are similar to the data segments illustrated in FIG. 4. In this example, these data segments form a packet 510, which is placed into packet payload 512 within data packet 500. In these examples, the message segments used for subnet management include an M_Key. The M_Key is used by the end node which is receiving the packet to determine if the subnet manager sending the packet has access to the subnet manager agent in the node. Additionally, data packet 500 contains CRC 514, which is used for error checking. Additionally, routing header 516 and transport 518 are present in data packet 500. Routing header 516 is used to identify source and destination ports for data packet 500. Transport header 518 in this example specifies the destination queue pair for data packet 500.

Additionally, transport header 518 also provides information such as the operation code, packet sequence number, and partition for data packet 500. The operating code identifies whether the packet is the first, last, intermediate, or only packet of a message. The operation code also specifies whether the operation is a send RDMA write, read, or atomic. The packet sequence number is initialized when communications is established and increments each time a queue pair creates a new packet. Ports of an end node may be configured to be members of one or more possibly overlapping sets called partitions.

SAN architecture management facilities provide for a subnet manager and an infrastructure that supports a number of general management services. The management infrastructure requires a subnet management agent in each node and defines a general service interface that allows additional general services agents. The SAN architecture includes a common management datagram (MAD) message structure for communicating between managers and management agents.

The subnet manager is an entity attached to a subnet that is responsible for configuring and managing switches, routers, and channel adapters. The subnet manager can be implemented with other devices, such as a channel adapter or a switch. The master subnet manager: (1) discovers the subnet topology; (2) configures each channel adapter port with a range of Local Identification (LID) numbers, Global Identification (GID) number, subnet prefix, and Partition Keys (P_Keys); (3) configures each switch with a LID, the subnet prefix, and with its forwarding database; and (4) maintains the end node and service databases for the subnet and thus provides a global unique identification (GUID) number to LID/GID resolution service as well as a services directory.

Each node provides a subnet manager agent that the subnet manager accesses through a well-known interface called the subnet management interface (SMI). Subnet manager interface allows for both LID routed packets and directed routed packets. Directed routing provides the means to communicate before switches and end nodes are configured.

SAN subnet management packets (SMPs) use an management key (M_Key) as an access control mechanism. When the subnet manager takes management control of a node, the subnet manager pushes its M_Key, along with a M_Key lease period, into each SAN component. The SAN component uses this M_Key to validate all future subnet management packets it receives within the M_Key lease period. Subsequent subnet management packets (SMPS) have their M_Key field compared with the value previously stored by subnet manager in the SAN component. If a M_Key field in a subnet management packet matches the M_Key value stored in the SAN component, the packet is accepted. Otherwise the packet is discarded.

The SAN architecture supports the notion of multiple subnet managers per subnet and specifies how multiple subnet managers negotiate for one to become the master subnet manager. Once a subnet manager gains control of a subnet, it can retain control as long as it does not lose its M_Key in the components of the subnet. Loss of the M_Key can happen under several circumstances. This loss can happen through a power cycle of the component which contains the M_Key, with the component coming up with the default M_Key when the power to the component is restored. This loss also may happen through a boot of the node which contains the subnet manager, such that the subnet manager goes away and the M_Key lease period expires in the component, in which case another subnet manager can take over control of the component.

The SAN architecture, in these examples, also supports the notion of a SM_Key. The SM_Key provides a additional level of authentication authority to control which subnet manager is allowed to be the master subnet manager. This also provides another level of granularity in determining which subnet managers are trusted is establishing standby subnet managers, that can backup the master subnet manager for redundancy and handoff.

SAN subnets can consist of thousands of nodes. The amount of time that this discovery and configuration process can take when all of the components are powered on, can be very large. This is particularly true in a large SAN environment, since, for example, complex algorithms may have to be executed to create correct and efficient routes for messages between nodes of the SAN. This situation can result in large boot times, which translates into lost time to the customer. This is particularly important when the boot is part of an error recovery process.

In addition, after initialization, a customer may want to change the assignments made by the subnet manager. Changes that a customer may want to make include: creation of multiple partitions, ports participating in a specific partition, and service levels that can be used by a given port. Without the ability to retain these changes, after each initialization the customer would have to redo all the assignments he had previously made.

The present invention provides a method, apparatus, and computer implemented instructions for solving the above problems by either having the subnet manager or the SAN components store the configuration information in some sort of non-volatile (NV) store. This non-volatile store may be, for example, a non-volatile random access memory (NVRAM) or magnetic storage media. In most cases the SAN configuration will not change significantly from one power on cycle to the next. By saving the information and only discovering the differences in configuration from the previous configuration, can save a lot of time in booting the system and can retain the manual changes made by the customer.

Figure 6:
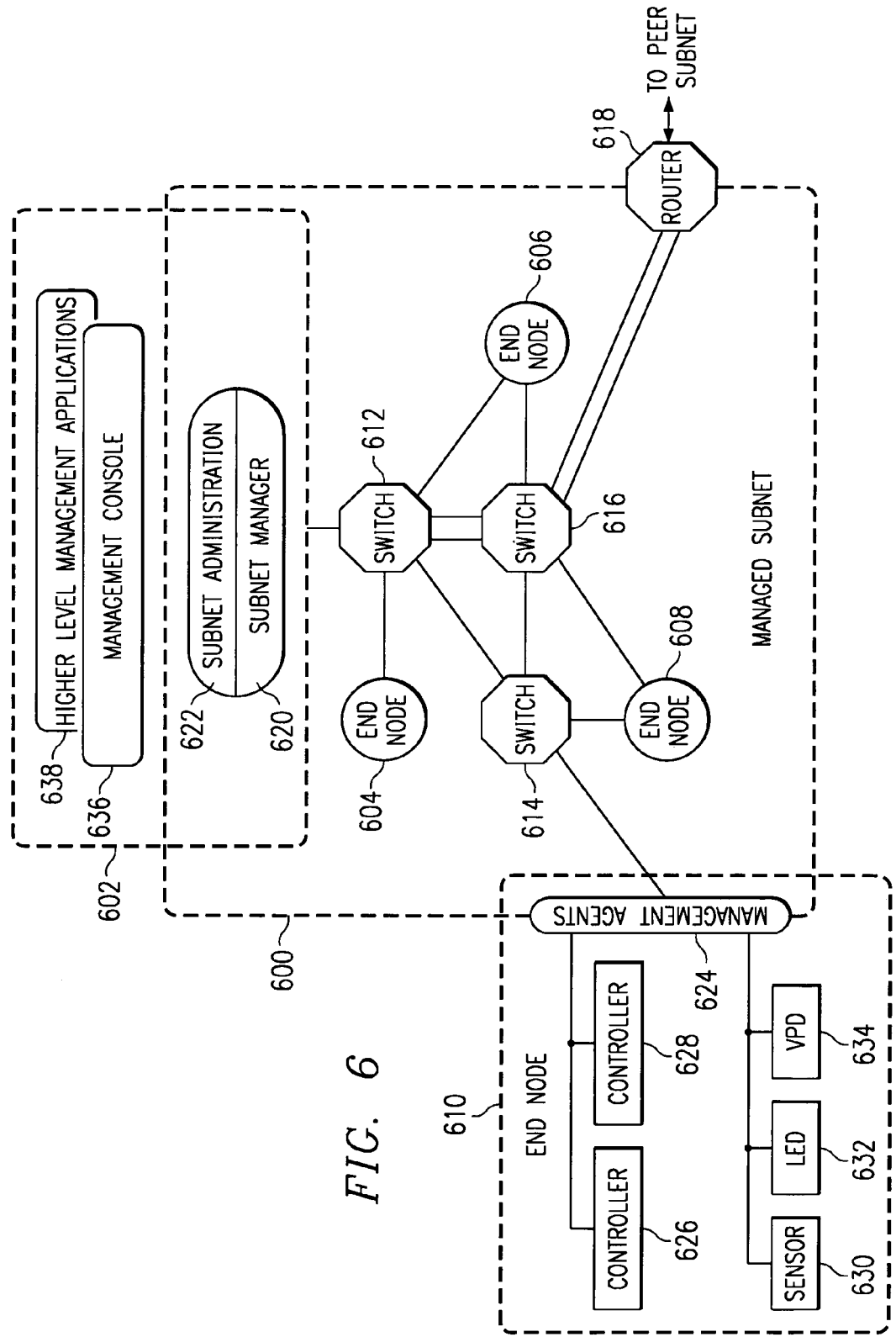
FIG. 6 is a diagram illustrating a system area network (SAN) management model in accordance with a preferred embodiment of the present invention.

Turning next to FIG. 6, a diagram illustrating a system area network (SAN) management model is depicted in accordance with a preferred embodiment of the present invention. In FIG. 6, the management of subnet 600 and SAN components like host processor node 602, end nodes 604-610, switches 612-616, and router 618 use two management services: subnet manager 620 and subnet administration 622. These two components are located in host node 602 in this example. A host node is a node which contains a host channel adapter and an end node is any node which is the source for or the target of packets on the network. Switches and routers are generally not end nodes, as they mostly pass packets through from one side to the other. However, switches and routers can be end nodes relative to subnet manager packets. Subnet manager packets are used to discover, initialize, configure, and maintain SAN components through the management agent 624 in end node 610. In this example, end node 610 includes a controller 626, controller 628, sensor 630, light emitting diode (LED) 632, and vital product data (VPD) 634.

SAN subnet management packets are used by the subnet manager to query and update subnet management data at components in the subnet. Control of some aspects of the subnet management are through a user management console 636 in a host processor node 602. Additionally, higher level management applications 638 may be used in place of or in conjunction with management console 636 to manage and configure subnet 600. In this example, subnet manager 620 may implement the processes of the present invention used to retain configuration and management information. Configuration information retained includes such items as the range of local identification (LID) numbers applicable, subnet prefix, and partition keys (P_Keys).

Figure 7:
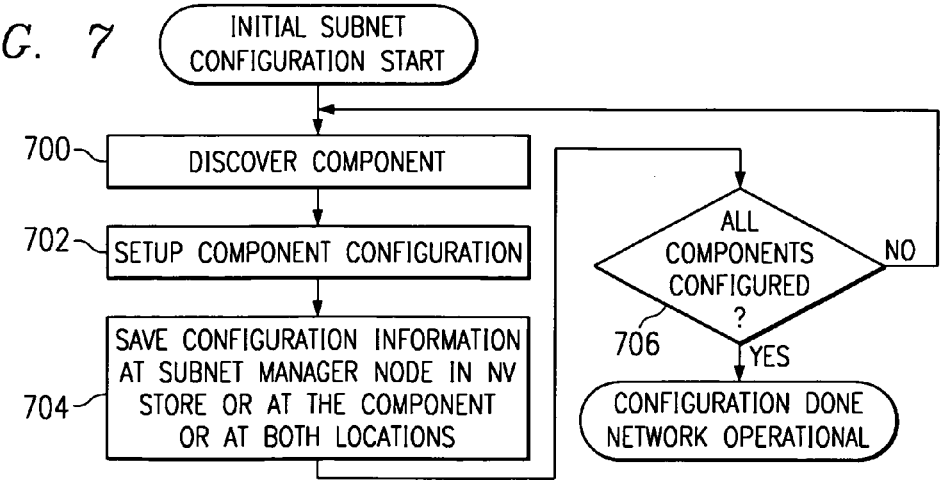
FIG. 7 is a flowchart of a process used for initial configuration of a subnet in accordance with a preferred embodiment of the present invention.

Turning next to FIG. 7, a flowchart of a process used for initial configuration of a subnet is depicted in accordance with a preferred embodiment of the present invention. The process illustrated in FIG. 7 may be implemented within a subnet manager, such as subnet manager 620 in FIG. 6.

Once the initial subnet configuration has started, a component is discovered (step 700). Step 700 is used by the subnet manager to sweep through the subnet to discover components within the subnet. Components may take various forms, such as, end nodes, switches, or routers. In these examples, subnet management packets are sent out by the subnet manager to discover components.

Next, the component configuration is setup (step 702). The component configuration is set up through the use of subnet management packets. Configuration information set up includes such items as the range of local identification (LID) numbers applicable, subnet prefix, and partition keys (P_Keys). The subnet manager looks at the component type as well as the other components in the system, the SAN configuration, and manually inputted user configuration information in order to determine what configuration should be set up for the component. Details about this initial component configuration is beyond the scope of the present invention. The configuration information is saved at the subnet manager node in the non-volatile (NV) store or at the component or at both locations (step 704). In these examples, the non-volatile store may take various forms, such as, for example, a NVRAM, a hard disk, or some other form of non-volatile store. This non-volatile store provides a mechanism to maintain configuration information during powering down of subnet components.

Next, a determination is made as to whether all the components have been configured (step 706). This decision step is used to continue the configuration and saving process until all of the components have been configured. If all components have been configured, the configuration is done and the network is operational.

With reference again to step 706, if all components have not been configured, the process returns to step 700.

Figure 8:
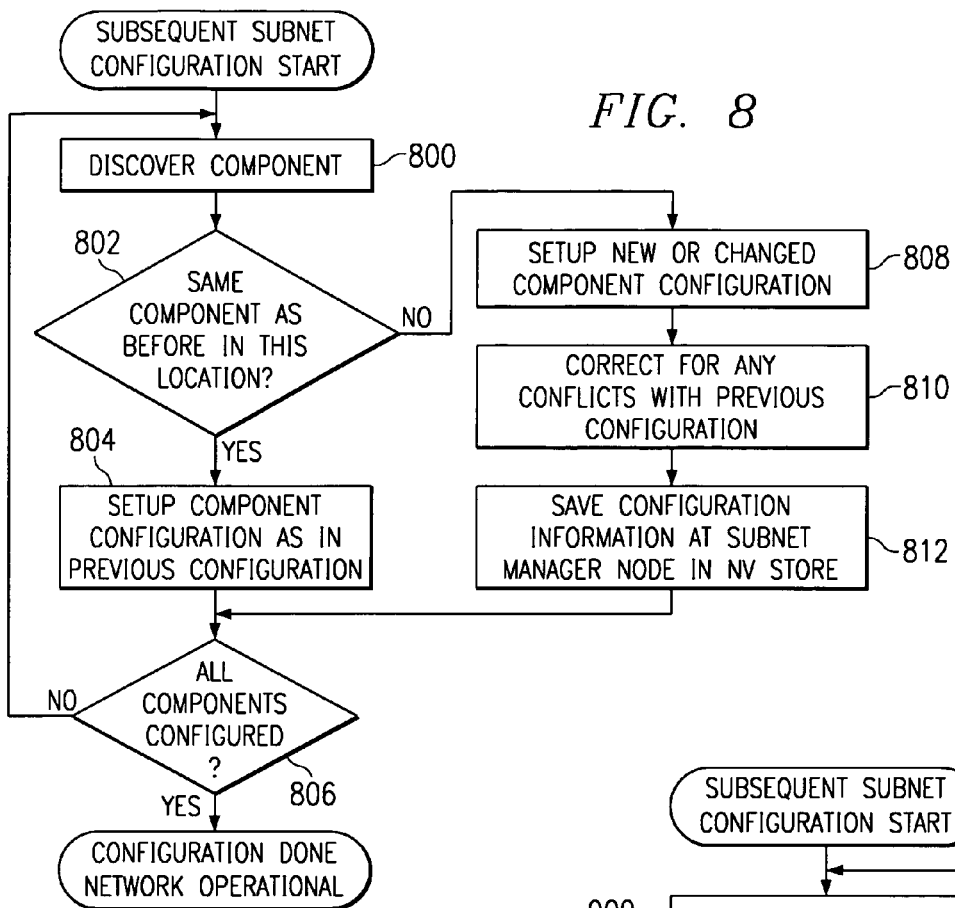
FIG. 8 is a flowchart of a process used for subsequent configurations of the subnet in accordance with a preferred embodiment of the present invention.

Turning next to FIG. 8, a flowchart of a process used for subsequent configurations of the subnet is depicted in accordance with a preferred embodiment of the present invention. The processes illustrated in FIG. 8 may be implemented in a subnet manager, such as subnet manager 620 in FIG. 6. In this example, the configuration information is stored within the node in which the subnet manager is located.

Once the subsequent subnet configuration has started, a component is discovered (step 800). A determination is then made as to whether this is the same component as before in this location (step 802). This determination could be done in a number of different ways. An example is to use the global identifier (GID) of the component, which is an identifier that is unique to that component. If this is the same component as before in this location, the component configuration is setup as in the previous configuration (step 804). In this case, the configuration can be more quickly restored than if the subnet manager was required to perform the calculations and determinations necessary to normally configure the component. Examples of a couple of the many items that may need to be calculated or determined for a component during configuration include determination of the component's LID, which must be unique in the subnet, switch routing tables, and the P_Keys that are applicable to the component. Next, a determination is made as to whether all components have been configured (step 806). If all components have been configured, the configuration is done and the network is operational.

With reference again to step 802, if this is not the same component as before in this location, a new or changed component configuration is setup (step 808). In step 808, no previously saved information is present that may be used for the component being addressed. In other words, the component may be a different component, such as if a new or different component was put in place of the original component. The saved configuration information, however, may still be used with other components. This set up is performed with the potential that previously configured components may have to be reconfigured. Then, any conflicts with the previous configuration are corrected (step 810). In step 810, changes to the saved configuration information are made to take in account conflicts or differences between the component originally present and the current component. The configuration information is saved at the subnet manager node in the non-volatile store (step 812) with the process returning to step 806.

With reference again to step 806, if all components have not been configured, the process returns to step 800.

With this process, when the system is powered on, the subnet manager can quickly traverse the switch ports that were used before, verifying that all the same components are present, which will be the case most of the time. Then, the subnet manager uses subnet management packets to send the same information back to the SAN component that the component had before the component was powered down. After all the previous components are set back to the prior state and the system is up and running, the switch ports that were not used before powering down can be queried to see if the switch ports contain new hardware, which was added to the switch ports while the power was off. In this case, steps 808, 810, and 812 may be delayed until the rest of the system is up and running, allowing the subnet system to power up and run faster.

Figure 9:
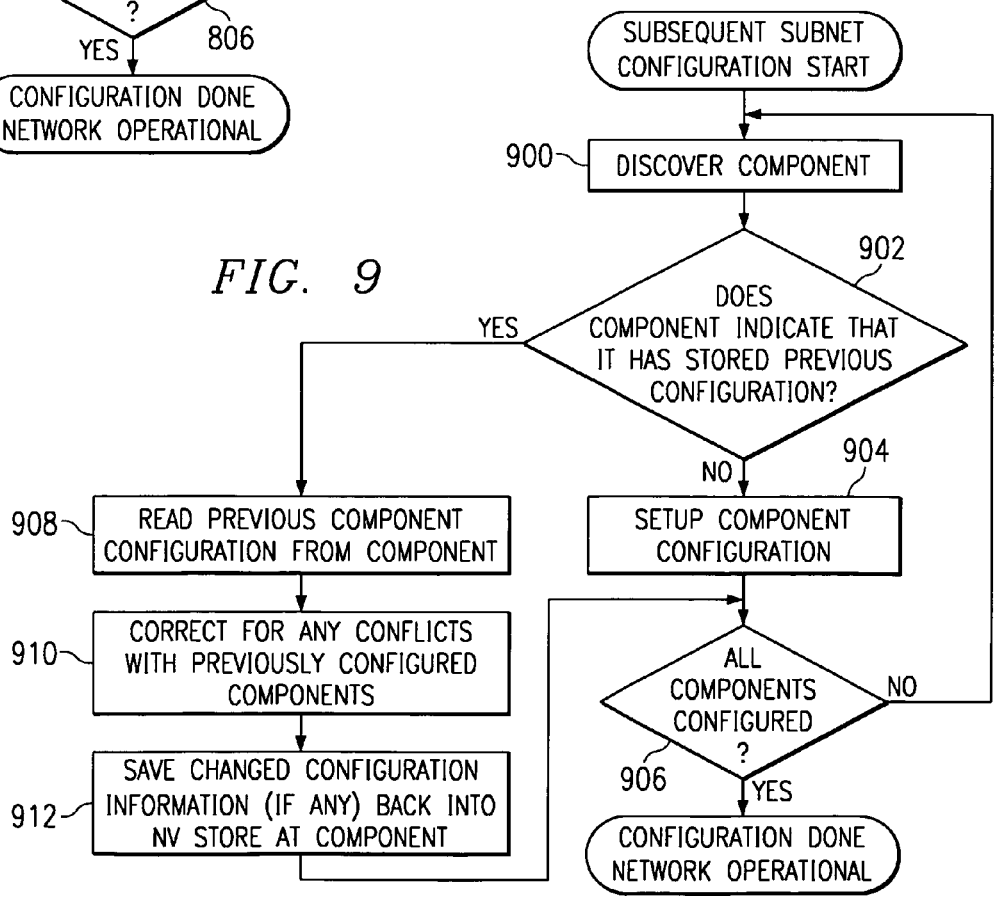
FIG. 9 is a flowchart of a process used for subsequent configuration of a subnet in accordance with a preferred embodiment of the present invention.

Turning next to FIG. 9, a flowchart of a process used for subsequent configuration of a subnet is depicted in accordance with a preferred embodiment of the present invention. The process illustrated in FIG. 9 may be implemented in a subnet manager, such as subnet manager 620 in FIG. 6. In this example, the configuration information is stored in a non-volatile store located at the subnet component. In this case, the configuration information is distributed throughout the subnet with each component retaining its configuration information in a non-volatile store, which is local to the component.

Once the subsequent subnet configuration has started, a component is discovered (step 900). A determination is then made as to whether the component indicates that it has stored the previous configuration (step 902). This determination is facilitated through the use of subnet management packets sent to the discovered component to identify whether previous configuration information is present for the component.

If the component does not indicate that it has stored the previous configuration, the component configuration is set up (step 904). Configuration information set up includes such items as the range of local identification (LID) numbers applicable, subnet prefix, and partition keys (P_Keys). The subnet manager looks at the component type as well as the other components in the system, the SAN configuration, and manually inputted user configuration information in order to determine what configuration should be set up for the component.

Next, a determination is made as to whether all components have been configured (step 906). If all components have been configured, the configuration is done and the network is operational.

With reference again to step 902, if the component does indicate that it has stored the previous configuration, the previous component configuration is read from the component (step 908). This information is obtained from the non-volatile store associated with the component. This step also includes configuring the component using the configuration information.

Next, any conflicts with the previous configuration are corrected (step 910). Conflicts can occur, for example, when components are moved around in the SAN, and since components in this embodiment take their old configuration information with them, if they are moved to other parts in the SAN, then configuration items like the component LIDs will conflict with routing tables or possibly other LIDs in the subnet. The changed configuration information, if any, is saved back into the non-volatile store at component(s) (step 912) with the process returning to step 906.

With reference again to step 906, if all components have not been configured, the process returns to step 900.

The embodiment of storing the information at the component as in FIG. 9, instead of at the subnet manager as in FIG. 8 has the advantage of distributing the configuration information across the SAN, making it less susceptible to loss in the event of a failure in the system. This added benefit comes at the cost of additional configuration conflict checking as the network is swept on power up, to allow for changes in configuration. That is, in order to allow for changes at power up, the subnet manager with this second embodiment has to check the configuration information that each component provides against the configuration that all the other components provide to determine if there are any conflicts. Although this takes less time than configuring when no configuration information is saved, it does not achieve all the benefits that are possible, as is possible with the next embodiment.

Turning next to FIG. 10, a flowchart of a process used for subsequent configuration of a subnet is depicted in accordance with a preferred embodiment of the present invention. The process illustrated in FIG. 10 may be implemented in a subnet manager, such as subnet manager 620 in FIG. 6. In this example, the configuration information is stored in a non-volatile store located at the subnet component and at the node in which the subnet manager is located. This approach retains the most state information and allows for the quickest configuration.

Once the subsequent subnet configuration has started, a component is discovered (step 1000). A determination is then made as to whether the component is the same as before in this location (step 1002). If this is not the same component as before in this location, the component configuration is set up (step 1004). Next, the configuration information is saved at the subnet manager node in the non-volatile store (step 1006). A determination is then made as to whether the component indicates that it can store the configuration (step 1008). If the component does indicate that it can store the configuration, the configuration information is saved into the non-volatile store at component (step 1010). Step 1010 is accomplished using a subnet manager packet, which is sent to the component to request that the component store the configuration information.

Next, a determination is made as to whether all components have been configured (step 1012). If all components have been configured, the configuration is done and the network is operational.

With reference again to step 1002, if the component is not the same as before in this location, a determination is made as to whether the component indicates that it has stored the previous configuration (step 1014). If the component indicates that it has stored the previous configuration, the previous component configuration is read from the component (step 1016). A determination is then made as to whether the component configuration is not the same as the previous configuration (step 1018). If the component configuration is not the same as the previous configuration, any conflicts with the previously configured components are corrected (step 1020). Then, the changed configuration information, if any, is saved back into the non-volatile store at component (step 1022). The configuration information is saved at the subnet manager node in the non-volatile store (step 1024) with the process then returning to step 1012 as described above.

With reference again to step 1008, if the component does not indicate that it can store the configuration, the process proceeds to step 1012. With reference again to step 1012, if all components have not been configured, the process returns to step 1000. With reference again to step 1014, if the component does not indicate that it has stored the previous configuration, the component configuration is set up (step 1026). Next, the configuration information is saved at the subnet manager node in the non-volatile store (step 1028) with the process proceeding to step 1012.

With reference again to step 1018, if the component configuration is the same as the previous configuration, the configuration is complete and the process returns to step 1012.

The advantage of this third embodiment in FIG. 10 is that when the configuration information is read from the component, the subnet manager only needs to check the information provided against the previous information saved in its own database for the component to see if the information changed. Thus, the case in which no changes are present in the SAN from the previous power-on cycle is faster to check for conflicts.

Thus, the present invention provides a method, apparatus, and computer implemented instructions for retaining configuration information between power cycles in which the subnet or devices within the subnet are turned off and on. This mechanism eliminates time consuming steps of determining and resolving configuration conflicts within the subnet. This result speeds system boot time, which is a key time in recovery from power outages in a subnet. In this manner, subnet availability is increased.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a network computing system for managing configuration information for a set of components in a network computing system, the method comprising:
    storing the configuration information for the set of components in the network computing system to form stored configuration information;
    responsive to a power cycle, obtaining current configuration information from the set of components;
    comparing the current configuration information with the stored configuration information to form a comparison;
    updating the stored configuration information if a difference is present in the comparison.

2. The method of claim 1, wherein the network computing system is a system area network.

3. The method of claim 1, wherein the storing step comprises:
    storing the configuration information at a node in the network computing system where the subnet manager resides.

4. The method of claim 1, wherein the storing step comprises:
    storing configuration information associated with a component along with the component.

5. The method of claim 1, wherein the stored configuration information is stored in one of a non-volatile random access memory, a hard disk drive, and an optical disk.

6. The method of claim 1, wherein the set of components are a set of nodes.

7. The method of claim 1, wherein the set of components are a set of devices within nodes.

8. A method in a network computing system for managing configuration information in the network computing system, the method comprising:
    discovering a component at a location on the network computing system;
    determining whether the component was previously in the location;
    configuring the component using previously stored configuration information for the component if the component was previously in the location; and
    configuring the component without the previously stored configuration information if the component was not previously in the location.

9. A data processing system comprising:
    a bus system;
    a communications adapter connected to the bus system;
    a memory including a set of instructions connected to the bus system;
    a processing unit connected to the bus system, wherein the processing unit executes the set of instructions to store the configuration information for the set of components in the network computing system to form stored configuration information; obtain current configuration information from the set of components responsive to a power cycle; compare the current configuration information with the stored configuration information to form a comparison; and update the stored configuration information if a difference is present in the comparison.

10. The data processing system of claim 9, wherein the processor unit includes a set of processors.

11. The data processing system of claim 9, wherein the processor unit includes a single processor.

12. The data processing system of claim 9, wherein the bus system includes a primary bus and a secondary bus.

13. A network computing system for managing configuration information, the network computing system comprising:
    storing means for storing the configuration information for a set of components in the network computing system to form stored configuration information;
    obtaining means, responsive to a power cycle, for obtaining current configuration information from the set of components;
    comparing means for comparing the current configuration information with the stored configuration information to form a comparison;
    updating means for updating the stored configuration information if a difference is present in the comparison.

14. The network computing system of claim 13, wherein the network computing system is a system area network.

15. The network computing system of claim 13, wherein the storing means comprises:
    second storing means for storing the configuration information at a node in the network computing system where the subnet manager resides.

16. The network computing system of claim 13, wherein the storing means comprises:
    second storing means for storing configuration information associated with a component along with the component.

17. The network computing system of claim 13, wherein the stored configuration information is stored in one of a non-volatile random access memory, a hard disk drive, and an optical disk.

18. The network computing system of claim 13, wherein the set of components are a set of nodes.

19. The network computing system of claim 13, wherein the set of components are a set of devices within nodes.

20. A data processing system in a network computing system for managing configuration information comprising:
    discovering means for discovering a component at a location on the network computing system;
    determining means for determining whether the component was previously in the location;
    first configuring means for configuring the component using previously stored configuration information for the component if the component was previously in the location; and
    second configuring means for configuring the component without the previously stored configuration information if the component was not previously in the location.

21. A computer program product in a computer readable medium for use in a network computing system for managing configuration information for a set of components in a network computing system, the computer program product comprising:
    first instructions for storing the configuration information for the set of components in the network computing system to form stored configuration information;
    second instructions for responsive to a power cycle, obtaining current configuration information from the set of components;
    third instructions for comparing the current configuration information with the stored configuration information to form a comparison;
    fourth instructions for updating the stored configuration information if a difference is present in the comparison.

22. A computer program product in a computer readable medium for use in a network computing system for managing configuration information in the network computing system, the computer program product comprising:

first instructions for discovering a component at a location on the network computing system;

second instructions for determining whether the component was previously in the location;

third instructions for configuring the component using previously stored configuration information for the component if the component was previously in the location; and fourth instructions for configuring the component without the previously stored configuration information if the component was not previously in the location.

* * * * *

UNITED STATES PATENT AND TRADEMARK OFFICE
CERTIFICATE OF CORRECTION

PATENT NO. : 7,636,772 B1 Page 1 of 1
APPLICATION NO. : 09/692365
DATED : December 22, 2009
INVENTOR(S) : Kirby et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2875 days.

Signed and Sealed this

Ninth Day of November, 2010

David J. Kappos
*Director of the United States Patent and Trademark Office*